United States Patent
Mensch et al.

(10) Patent No.: US 12,146,358 B2
(45) Date of Patent: Nov. 19, 2024

(54) FLAP UNIT FOR AN OPENING ON A VEHICLE, AND VEHICLE

(71) Applicant: Witte Automotive GmbH, Velbert (DE)

(72) Inventors: Reinaldo Mensch, Wuppertal (DE); Markus Herdering, Bochum (DE); Zdenek Slovan, Plzen (CZ)

(73) Assignee: Witte Automotive GmbH, Velbert (DE)

( * ) Notice: Subject to any disclaimer, the term of this patent is extended or adjusted under 35 U.S.C. 154(b) by 338 days.

(21) Appl. No.: 17/822,149

(22) Filed: Aug. 25, 2022

(65) Prior Publication Data
US 2023/0061574 A1 Mar. 2, 2023

(30) Foreign Application Priority Data
Aug. 25, 2021 (DE) ...................... 10 2021 209 348.5

(51) Int. Cl.
| | | |
|---|---|---|
| *E05F 1/10* | (2006.01) | |
| *B60K 15/05* | (2006.01) | |
| *E05B 83/34* | (2014.01) | |
| *E05F 15/611* | (2015.01) | |

(52) U.S. Cl.
CPC ................ *E05F 1/10* (2013.01); *B60K 15/05* (2013.01); *E05B 83/34* (2013.01); *B60K 2015/0561* (2013.01); *E05F 15/611* (2015.01); *E05Y 2201/47* (2013.01); *E05Y 2900/534* (2013.01)

(58) Field of Classification Search
CPC .......... E05F 1/10; E05F 15/611; B60K 15/05; B60K 2015/0561; B60K 2015/053; E05B 83/34; E05Y 2201/47; E05Y 2900/534; Y02T 10/70; Y02T 10/7072; Y02T 90/14
See application file for complete search history.

(56) References Cited

U.S. PATENT DOCUMENTS

| | | | | |
|---|---|---|---|---|
| 11,634,025 | B2* | 4/2023 | Rudolf | E05D 3/145 49/339 |
| 2022/0034146 | A1* | 2/2022 | Rudolf | E05D 3/145 |
| 2022/0242227 | A1* | 8/2022 | Salter | B60L 53/16 |

FOREIGN PATENT DOCUMENTS

| | | |
|---|---|---|
| CZ | 2019398 A1 | 1/2021 |
| DE | 19604959 A1 | 8/1997 |
| DE | 19517705 C2 | 11/1998 |
| DE | 19919251 A1 | 11/2000 |
| DE | 102012009018 A1 | 11/2013 |
| DE | 202016105735 U1 | 10/2016 |

(Continued)

OTHER PUBLICATIONS

DE 19919251 A1 in English and German (Year: 2000).*

(Continued)

*Primary Examiner* — Lori Lyjak
(74) *Attorney, Agent, or Firm* — Marshall & Melhorn, LLC

(57) ABSTRACT

A flap unit for covering a charging opening or tank opening of a vehicle may have a frame and a movable cover, which is arranged within a peripheral region of the frame. The cover may be movable between a closed position, in which the cover terminates flush with the frame and is held in place, and an open position. The cover in the case of an opening movement from the closed position as well as in the case of a closing movement from the open position is movable into a partially raised intermediate position.

11 Claims, 7 Drawing Sheets

(56) References Cited

FOREIGN PATENT DOCUMENTS

DE  102017223396 A1  6/2019
DE  102020207669 A1  12/2021

OTHER PUBLICATIONS

EP 1571029 A2 in English (Year: 2005).*
DE 202016105735 U1 in English and German (sited on IDS Aug. 25, 2022 in German) (Year: 2016).*
WO 2020253893 A1 in English (Year: 2020).*
European Patent Office, Extended European Search Report in Application No. EP22192150, dated Mar. 20, 2023, 5 pages, Munich, Germany.
German Patent and Trademark Office, Office Action in Application No. 10 2021 209 348.5, dated Mar. 6, 2022, 7 pages, Munchen, Germany.

* cited by examiner

FLAP UNIT FOR AN OPENING ON A VEHICLE, AND VEHICLE

FIELD

The invention relates to a flap unit for covering an opening, in particular a charging opening or tank opening, on a vehicle. Furthermore, the invention relates to a vehicle having such a flap unit.

BACKGROUND

In vehicles, openings in the vehicle body, such as a charging opening or tank opening, are closed by means of a cover or flap (also called a closure lid) in order to prevent contamination and misuse. Flaps are known, for example, from DE 10 2020 207 669 A1 or DE 10 2012 009 018 A1.

SUMMARY

The object of the present invention is to provide a flap unit for covering an opening on a vehicle, the flap unit being simple and easy to operate. In particular, a flap unit is to be specified which is held sufficiently tightly in a closed position even in the case of a large, in particular long, cover. A further object of the invention is to specify a vehicle with an improved flap unit.

The first-mentioned object is achieved in accordance with the invention by a flap unit having the features of the claims. With regard to the vehicle, the object is achieved in accordance with the invention with the features of the claims.

The dependent claims relate to advantageous developments.

The flap unit according to the invention for covering an opening, in particular a charging opening or tank opening, of a vehicle comprises at least one frame and a cover, for example a closure lid or a closure flap, which is movably arranged on the frame by means of an adjusting mechanism, wherein the cover is movable between a closed position and an open position, and, both in the case of an opening movement of the cover from the closed position into the open position and in the case of a closing movement of the cover from the open position into the closed position, the adjusting mechanism is pivotable about a first axis of rotation and the cover is pivotable relative to the adjusting mechanism about a second axis of rotation and is movable at least partially translationally into an, in particular partially, raised intermediate position. In this case, the cover is in particular movable pivotably and partially translationally in combination into the raised intermediate position in such a way that the cover is unlocked.

The cover is configured such that it can be operated both electrically and manually.

The advantages achieved with the invention lie in particular in the fact that, by means of the partially raised intermediate position of the cover, for example during the closing movement, a holding end of the cover facing away from the drive is first contacted with the frame, so that, during a further closing movement of this holding end of the cover facing away from the drive, the cover can be brought interlockingly into the closed, in particular locking, position and then a drive end of the cover is placed flush and sealingly against the frame. A higher sealing force of the cover on the frame is thus made possible, since the drive force, in particular a motor force, acts on the drive end and a counter-bearing is formed on the holding end of the cover facing away from the drive.

In addition, such a flap unit with drive end or drive side and locking counter-bearing on the holding end of the cover facing away from the drive allows increased security against vandalism, since the cover rests interlockingly on both sides or ends and is locked.

Furthermore, a flush orientation of the cover on the frame is made possible by means of a wedge-shaped undercut on the holding end of the cover facing away from the drive.

In the case of an opening movement of the cover, however, the raised intermediate position makes it possible for the drive end of the cover to be raised initially and the holding end facing away from the drive to be opened only later, in particular pivoted outwardly into the open position. An ice-breaking force is hereby increased. For example, this is made possible by a forward motion at the drive end, which is first raised into the intermediate position, wherein the holding end of the cover facing away from the drive continues to contact the frame. The cover is thus not rigidly connected to the frame and is not removed simultaneously and in parallel from the frame.

A further aspect provides that, as the cover is moved from the raised intermediate position into the open position, and vice versa, the cover together with the adjusting mechanism is pivotable about the first axis of rotation. Here, the cover is moved relative to the frame and, for example, to a vehicle body shell in which the frame is mounted, and in so doing is opened or closed.

A development provides that the adjusting mechanism is arranged between the cover and the frame. In particular, the adjusting mechanism is arranged at the drive end of the movable cover between cover and frame.

In particular, the cover can be positioned relative to the frame by means of the adjusting mechanism in the partially tensioned, raised intermediate position such that the drive end of the cover is raisable or raised, in particular is raisable or raised at a distance from the frame, and the opposite end of the cover facing away from the drive contacts the frame.

A further exemplary embodiment provides that the cover can be releasably locked to the frame at the holding end, in particular on the side of the cover facing away from the drive, by means of a locking mechanism. For example, the locking mechanism is formed as a latching mechanism, in particular an interlocking latching connection. In the closed position of the cover, a counter-bearing for the drive end of the cover is thus provided at the holding end of the cover facing away from the drive.

In a further exemplary embodiment, the adjusting mechanism comprises a double pivot joint. For example, the double pivot joint comprises a first pivot joint which is articulated to the frame and is connected via a connection member to a second pivot joint which is articulated to the cover. In other words, compared to a conventional adjusting device for a cover, the adjusting mechanism of the present cover comprises an additional pivot joint. The connection member is formed in particular as a pivot lever, coupling lever or adjusting lever or pivot arm, coupling arm or adjusting arm.

The connection member, in particular the adjusting lever, is coupled on the one hand to the cover and, on the other hand, is mounted on the frame pivotably about the first axis of rotation by means of the first pivot joint. The adjusting lever is formed, for example, in such a way that it moves the cover out of the plane of the frame, in particular pivots it first into the raised intermediate position and lifts it and then pivots it into the open position.

The adjusting lever can be formed in one piece. The adjusting mechanism has a joint socket, arranged on the frame, for the first pivot joint. The cover additionally comprises an inner bearing element for the second pivot joint.

In one possible embodiment, the cover can be formed in one piece. Alternatively, the cover can be formed in several parts, in particular in two parts.

The actuation and/or adjustment of the cover can take place manually, for example by means of pressure actuation and manual adjustment movement, or electrically, for example by means of an electrically movable cover.

The adjusting mechanism can be coupled, for example, to an actuating mechanism for the cover. An electrical actuating mechanism is coupled directly to the adjusting mechanism and can be formed, for example, as a motor drive, in particular a spindle drive or gear drive. A manual actuating mechanism is coupled directly to the cover and can be formed, for example, as a pressure actuator, in particular a so-called push-push mechanism.

In addition, a spring element can be provided in particular at the drive end of the cover, in particular in the region of the second pivot joint, and can be used to hold the cover in the closed position in a tensioned manner in the direction of the frame. In particular in the case of a large-area cover, when the spring is tensioned in the closed position, the largest possible sealing pressure can be generated, so that the cover terminates flush with the frame and rests sealingly against the frame. For example, the spring element is formed as a bistable leg spring.

In a simple exemplary embodiment, the axes of rotation of the first pivot joint and of the second pivot joint are arranged parallel to one another. Depending on the opening direction of the cover, opening vertically or horizontally, the axes of rotation can run correspondingly horizontally or vertically.

The connection member, in particular formed as an adjusting lever, pivot lever or coupling lever, is configured such that it moves at the first pivot joint about the first axis of rotation in a first arc. The cover, in particular a closure lid, is configured such that it moves at the second pivot joint about the second axis of rotation in a second arc.

A vehicle according to the invention comprises an opening, in particular a charging opening or tank opening, and the previously described flap unit for covering the opening.

DESCRIPTION OF THE FIGURES

Embodiments of the invention are explained in greater detail with reference to the drawings, in which.

DETAILED DESCRIPTION

Parts corresponding to one another are provided with the same reference signs in all the drawings.

Figure 1:
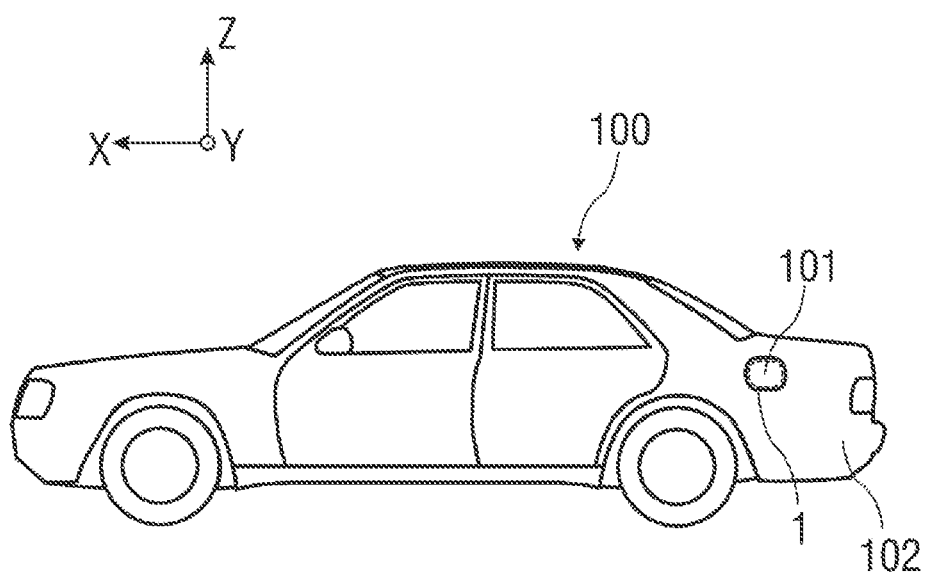
FIG. 1 shows a vehicle with an opening and a flap unit for covering the opening.

FIG. 1 shows a vehicle 100 with an opening 101 in a vehicle body shell 102. The opening 101 is, for example, a tank opening or charging opening. The opening 101 can be covered, for example, by means of a flap unit 1, which is described in more detail below. The flap unit 1 is mountable in the vehicle body shell 102 in the region of the opening 101.

With reference to the drawings, a flap unit 1 is described below in a Cartesian coordinate system, which is defined by three spatial directions arranged perpendicularly to one another. When the flap unit 1 is installed in the vehicle 100, a longitudinal direction X runs essentially horizontally and preferably parallel to a longitudinal direction of the vehicle 100 corresponding to the ordinary direction of travel of the vehicle 100. A transverse direction Y, which runs perpendicular to the longitudinal direction X, is likewise horizontally oriented in the vehicle 100 and runs parallel to a transverse direction Y of the vehicle 100. A vertical direction Z runs perpendicular to the longitudinal direction X and perpendicular to the transverse direction Y. A vertical arrangement should be understood to mean an arrangement which runs parallel to the vertical direction Z is meant.

Figure 2:
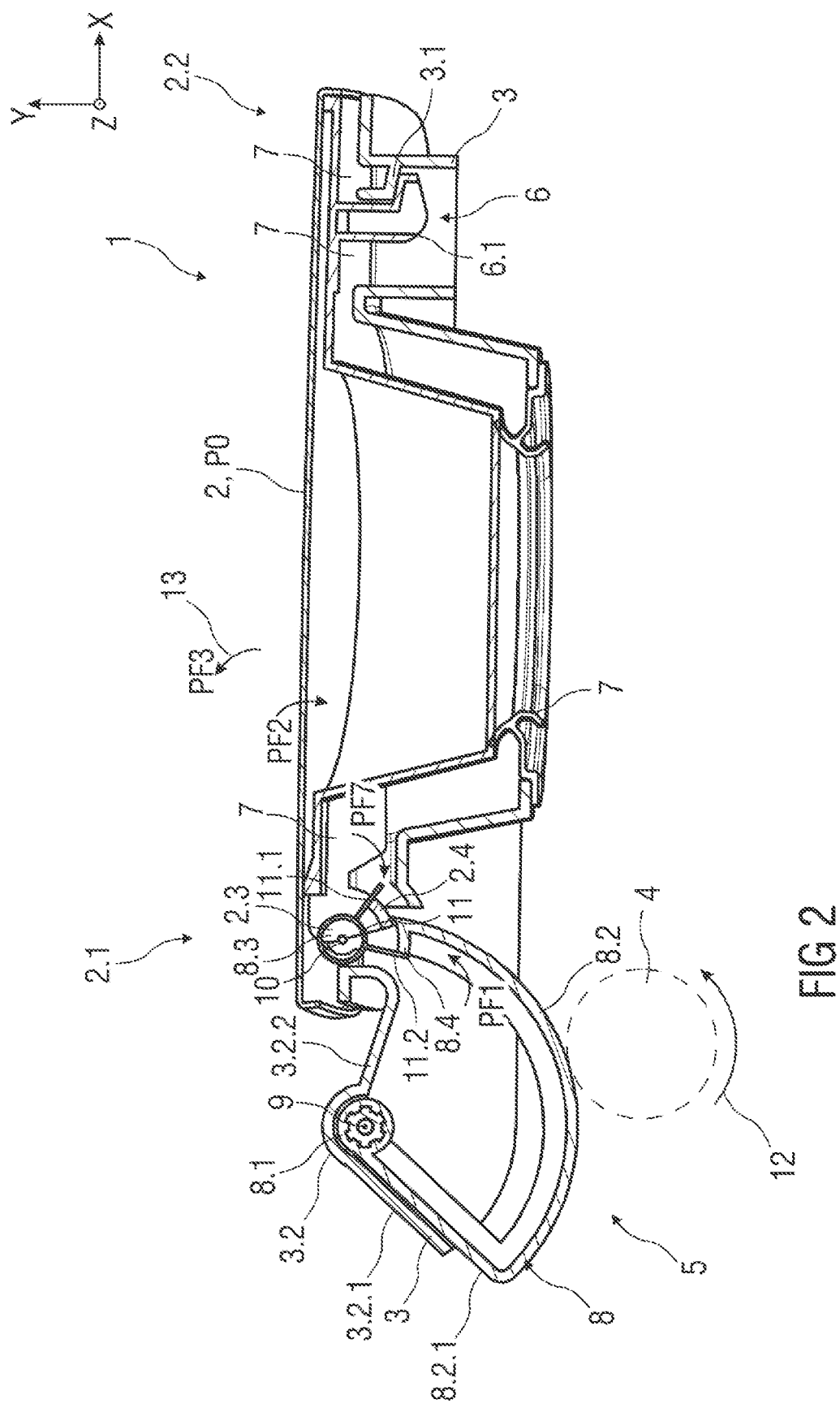
FIG. 2 shows a sectional view of a flap unit with a cover in a closed position.

FIG. 2 shows a schematic sectional representation of a first embodiment of a flap unit 1 with a cover 2.

The flap unit 1 comprises at least the cover 2 and a frame 3. The cover 2 is arranged within a peripheral region of the frame 3. The flap unit 1 is inserted with the frame 3 into the opening 101 in the vehicle body shell 102 and fastened there. The frame 3 forms, for example, an edge of the opening 101.

FIG. 2 shows the cover 2 in a closed position P0, in which the cover 2 is in particular flush with the frame 3. The cover 2 serves to cover an opening 101, in particular a charging opening or tank opening, of a vehicle 100 (not shown). For this purpose, the flap unit 1 is arranged and mounted accordingly by means of the frame 3, for example in a receptacle (not shown) in a vehicle body shell 102 so that the cover 2 terminates both flush with the frame 3 and flush with the vehicle body shell 102.

The cover 2 is a movable cover 2 and, for example, is formed as a closure lid or a closure flap for the charging opening or tank opening. The cover 2 can be pot-shaped, as shown. Alternatively, the cover 2 can take the form of a plate. Facing away from the frame 3, the cover 2 has a surface shape corresponding to a vehicle body shell 102, in particular a largely planar or slightly curved shape.

The cover 2 is configured such that it can be actuated and/or adjusted both electrically and manually.

The cover 2 can be adjusted electrically. An electrical drive mechanism 4 is coupled, for example, to an adjusting mechanism 5 for the cover 2 and can be formed, for example, as a motor drive, in particular a spindle drive or gear drive. The drive mechanism 4 and the adjusting mechanism 5 are arranged at a drive end 2.1 of the cover 2 and are coupled thereto.

At a holding end 2.2 of the cover 2 opposite the drive end 2.1, the cover is provided with a closure mechanism 6, for example a latching hook 6.1. The cover 2 can be releasably locked to the frame 3 by means of the closure mechanism 6. For example, the closure mechanism 6 is formed as a latching mechanism, in particular an interlocking latching connection. In the closed position P0 of the cover 2, a counter-bearing for the drive end 2.1 of the cover 2 is thus formed on the holding end 2.2 of the cover 2 facing away from the drive.

In the closed position P0 of the cover 2, for example, the latching hook 6.1 engages in a releasably locking manner in an undercut 3.1 of the frame 3.

In the direction of the frame 3 the cover 2 is provided on the inside with a seal 7, for example a sealing ring, sealing lips and/or sealing strip. Additionally or alternatively, the frame 3 can be provided with a seal 7, in particular a sealing ring, sealing lips and/or sealing strip, in the direction of the cover 2.

The adjusting mechanism 5 can alternatively be coupled to a manual actuating mechanism, not shown in more detail, for the cover 2. Such a manual actuating mechanism is coupled in particular directly to the cover 2 and can be formed, for example, as a pressure actuator, in particular a so-called push-push mechanism, on the cover 2.

Figure 3:
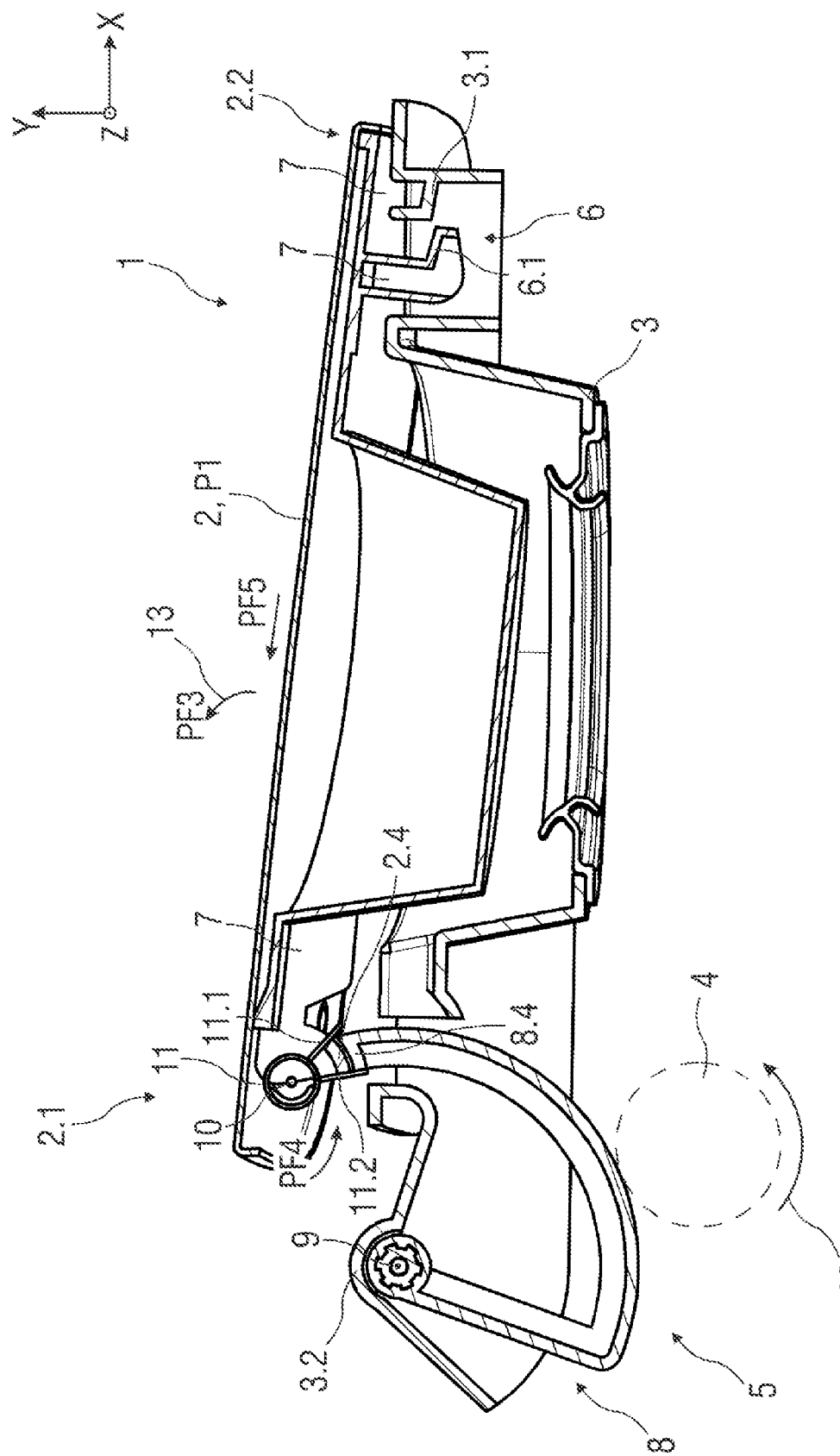
FIG. 3 shows a sectional view of a flap unit with a cover in a raised intermediate position, in which the cover contacts the frame at least in regions.

By means of the adjusting mechanism 5, the cover 2 is pivotable, not only in the case of an opening movement of the cover 2 from the closed position P0 into an open position P2 (shown in FIG. 5) but also in the case of a closing movement of the cover 2 from the open position P2 into the closed position P0, about a first axis of rotation 9, wherein the cover 2 is pivotable relative to the adjusting mechanism 5 about a second axis of rotation 10 and is movable at least partially translationally into a partially raised intermediate position P1 (shown in FIG. 3).

When the cover 2 is moved from the partially raised intermediate position P1 into the open position P2, and vice versa, the cover 2 is pivotable together with the adjusting mechanism 5 about the first axis of rotation 9.

The adjusting mechanism 5 can be formed as a double pivot joint 8. For example, the double pivot joint 8 comprises a first pivot joint 8.1, which is articulated to the frame 3 and is connected via a connection member 8.2 to a second pivot joint 8.3, which is articulated to the cover 2.

Compared to a conventional adjusting device for a cover 2, the adjusting mechanism 5 of the present cover 2 comprises an additional joint, in particular the second pivot joint 8.3.

The connection member 8.2 is formed in particular as a pivot lever, coupling lever or adjusting lever or pivot arm, coupling arm or adjusting arm.

The connection member 8.2 is coupled on the one hand to the cover 2 and on the other hand is mounted on the frame 3 pivotably about the first axis of rotation 9 by means of the first pivot joint 8.1. The cover 2 is pivotably mounted relative to the frame 3 by means of the pivotably mounted connection member 8.2.

The connection member 8.2 can be formed in one piece. The adjusting mechanism 5 has a joint socket 3.2, arranged on the frame 3, for the first pivot joint 8.1. The joint socket 3.2 is formed in the region of the drive end 2.1. In section, the connection member 8.2 is formed as a 2-leg, L-shaped, hook-shaped or arcuate pivot lever. The connection member 8.2 has, at an end facing the frame 3, in particular the joint socket 3.2, the first pivot joint 8.1 and an adjusting pin 8.4 at an end facing the cover 2. The first pivot joint 8.1 is sleeve-shaped or cylindrical or spherical.

Two stop arms 3.2.1 and 3.2.2, which serve as end stops for the adjusting mechanism 5 of the cover 2, in particular for the double pivot joint 8, for example for the connection member 8.2 thereof, project from the joint socket 3.2. The stop arms 3.2.1 and 3.2.2 project from the joint socket 3.2 in such a way that the pivoting movement of the cover 2 between the closed position P0 and the open position P2 (shown in FIG. 5) is limited. For this purpose, at least one leg 8.2.1 of the connection member 8.2 strikes in the closed position P0 against the stop arm 3.2.1 (shown in FIG. 2) and in the open position P2 against the stop arm 3.2.2 (shown in FIG. 5).

Moreover, the cover 2 has an inner bearing element 2.3 for the second pivot joint 8.3. The cover 2 is mounted pivotably about the second axis of rotation 10 relative to the frame 3 and the connection member 8.2 by means of the second pivot joint 8.3.

In one possible embodiment, the cover 2 can be formed in one piece. Alternatively, the cover 2 can be formed in several parts, in particular in two parts.

In addition, a spring element 11 can be provided on the drive side, the drive end 2.1, of the cover 2, in particular in the region of the second pivot joint 8.3. By means of the spring element 11, the cover 2 is held in a pretensioned manner on the frame 3 in the closed position P0.

In particular, in the case of a large-area cover 2, in the closed position P0, when the spring element 11 is tensioned, the greatest possible sealing pressure can be generated, so that the cover 2 terminates flush with the frame 3 and rests sealingly against the frame 3 by means of the seals 7. For example, the spring element 11 is formed as a bistable leg spring.

The spring element 11 has two spring arms 11.1, 11.2. The spring element 11 is tensioned in the closed position P0 of the cover 2. The spring force of the spring element 11 pulls the two spring arms 11.1 and 11.2 towards each other, as shown by the arrows PF1. As a result, both the plate pin 2.4 and the adjusting pin 8.4 are acted upon with an associated spring force of the respective spring arm 11.1 or 11.2. As a result of this spring force of the spring element 11, the cover 2 is pulled in the direction of the frame 3 according to arrow PF2, so that the cover 2 rests against the frame 3 interlockingly and sealingly.

In a simple exemplary embodiment, the first axis of rotation 9 of the first pivot joint 8.1 and the second axis of rotation 10 of the second pivot joint 8.3 are arranged parallel to one another. Depending on the opening direction of the cover 2, opening vertically or horizontally, the axes of rotation 9, 10 can run correspondingly horizontally or vertically. In the exemplary embodiment, the axes of rotation 9, 10 run vertically and the cover 2 can be opened in the horizontal direction according to arrow PF3.

The connection member 8.2, in particular formed as an adjusting lever, pivot lever or coupling lever, is configured in such a way that it moves at the first pivot joint 8.1 about the first axis of rotation 9 thereof in a first arc 12. The cover 2, in particular a closure lid, is configured such that it moves at the second pivot joint 8.3 about the second axis of rotation 10 thereof in a second arc 13 according to arrow PF3.

Both in the case of an opening movement from the closed position P0 of the cover 2 and in the case of a closing movement from the open position P2 of the cover 2, the cover 2 is movable in each case into the partially raised intermediate position P1, which is shown in FIG. 3.

FIG. 3 shows a sectional view of the flap unit 1 with the cover 2 in the partially raised intermediate position P1, in which the cover 2 contacts the frame 3 at least in regions.

In particular, the cover 2 in the partially raised intermediate position P1 is positionable or positioned relative to the frame 3 by means of the adjusting mechanism 5 in such a way that the drive end 2.1 of the cover 2 is raised and is at a distance from the frame 3, and the opposite holding end 2.2 of the cover 2 facing away from the drive continues to contact the frame 3, wherein the cover 2 is already unlocked.

The latching hook 6.1 is disengaged from the undercut 3.1, which is formed, for example, as a latching projection on the frame 3.

The adjusting mechanism 5 is formed, for example, in such a way that it moves the cover 2 out of the plane of the frame 3, in particular pivots it first into the raised intermediate position P1. For example, the adjusting mechanism 5 is configured such that the cover 2 is first moved in the first arc 12 about the first axis of rotation 9, so that the drive end 2.1 is raised relative to the frame 3 and to the vehicle body shell 102, and the holding end 2.2 is unlocked. In this case, the opposite holding end 2.2 remains in contact with the frame 3. Alternatively, the flap unit 1 can be designed without a frame. In such an alternative exemplary embodiment, the cover 2 remains with its holding end 2.2 in contact with the vehicle body shell 102.

In addition, the spring element 11 relaxes, wherein the spring arm 11.2 is moved in the direction of the cover 2 according to arrow PF4, so that the cover 2 pivots relative to the adjusting mechanism 5 about the second axis of rotation 10 in a second arc 13 according to arrow P3 and is moved at least partially translationally according to arrow PFS, so that the drive end 2.1 of the cover 2 is raised and the cover 2 is unlocked, in particular the latching hook 6.1 is disengaged from the undercut 3.1.

Figure 4:
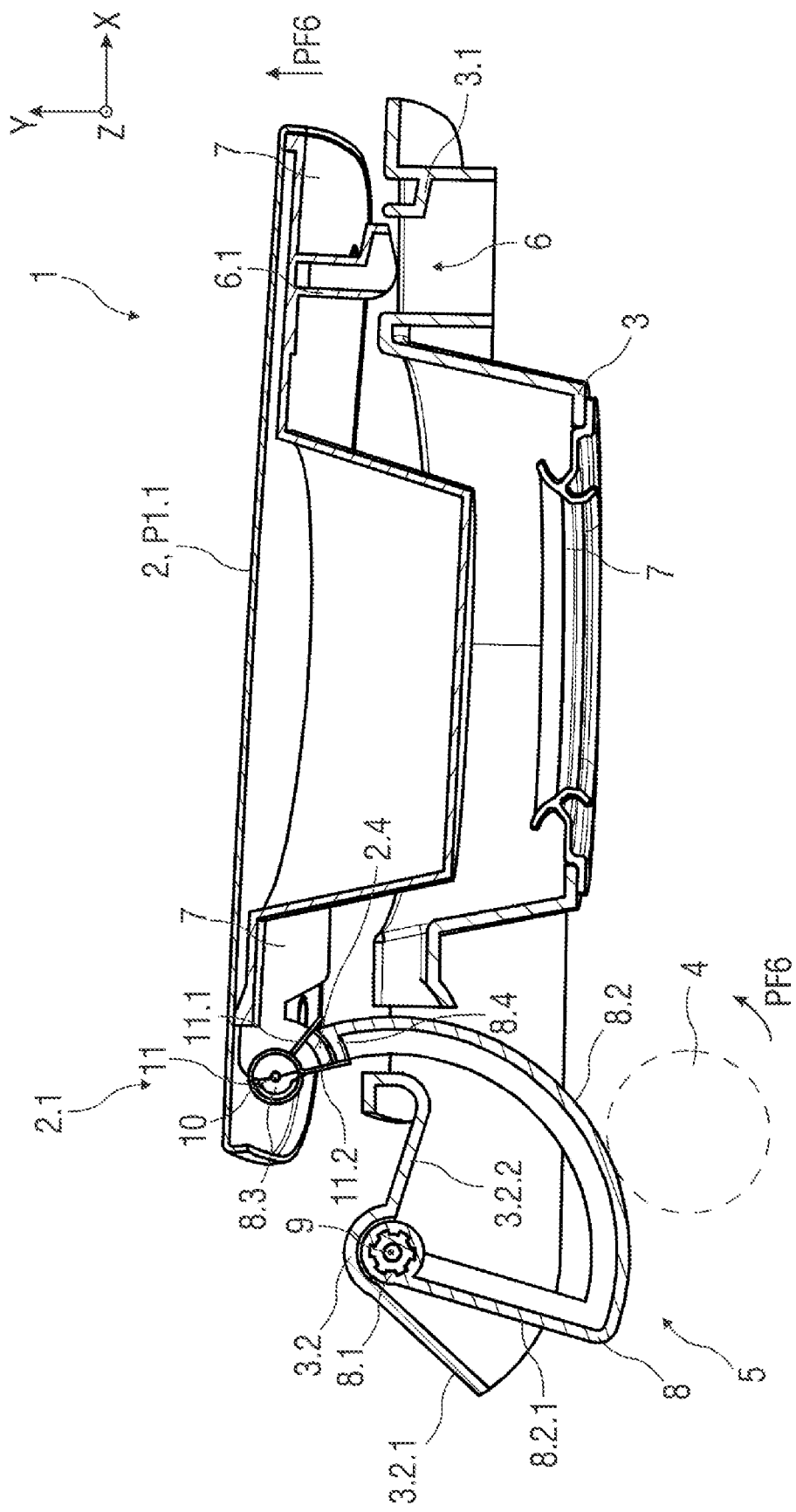
FIG. 4 shows a sectional view of a flap unit with a cover in a raised intermediate position which is at a distance from the frame.

FIG. 4 shows a sectional view of the flap unit 1 with the cover 2 in a fully raised intermediate position P1.1, in particular fully at a distance from the frame 3, in which the holding end 2.2 of the cover 2 no longer contacts the frame 3. In this fully raised intermediate position P1.1, the cover 2 passes through further movement of the adjusting mechanism 5, in particular of the connection member 8.2, about the first axis of rotation 9 according to arrow PF6. In this case, the cover 2 is pivoted together with the connection member 8.2 about the first axis of rotation 9. The spring element 11 remains relaxed.

Figure 5:
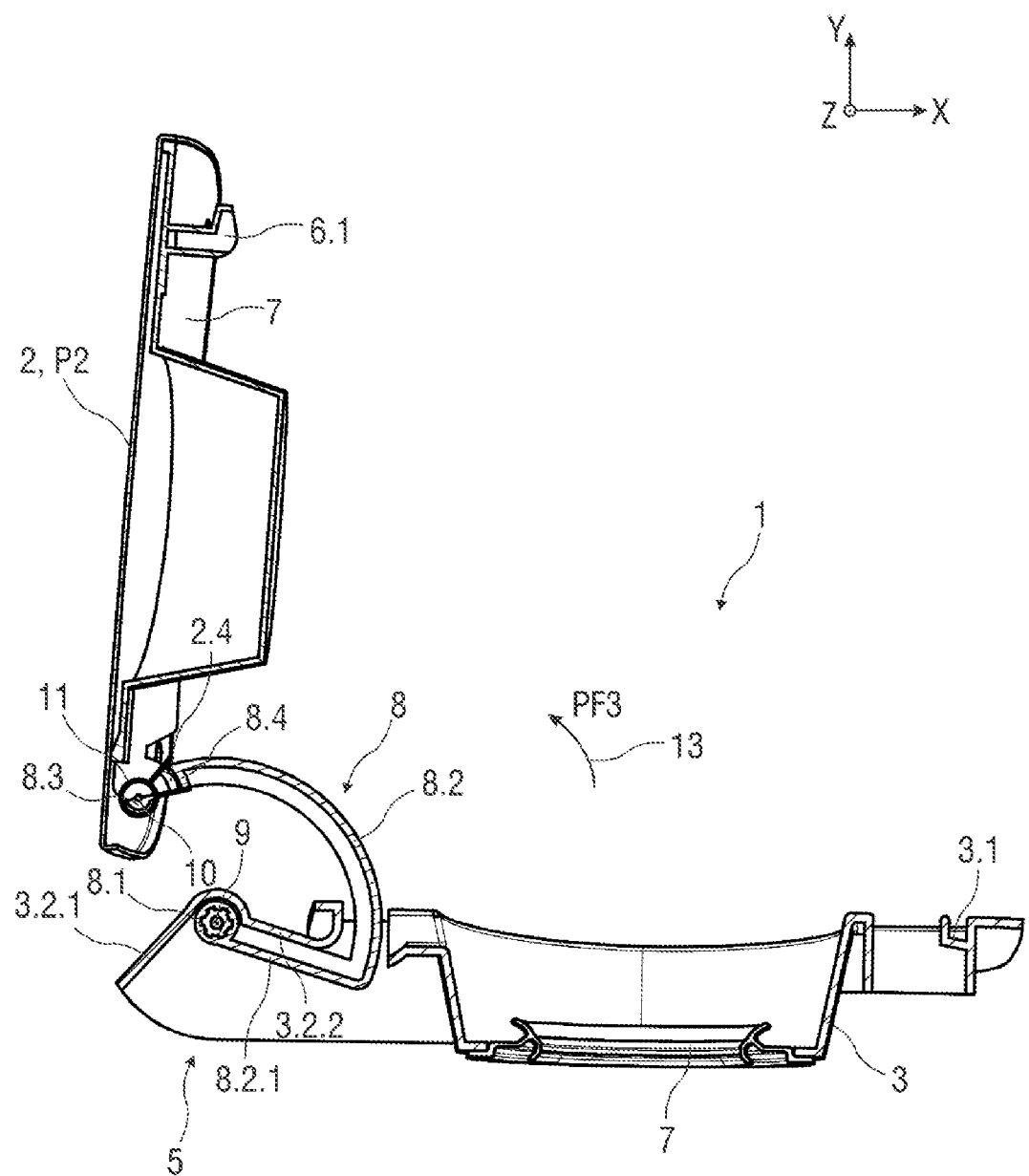
FIG. 5 shows a sectional view of a flap unit with a cover in an open position.

FIG. 5 shows a sectional view of the flap unit 1 with the cover 2 in the open position P2. In the open position P2, the cover 2 is arranged largely perpendicularly to the frame 3. The spring element 11 remains relaxed. The cover 2 has been pivoted together with the adjusting mechanism 5 about the first axis of rotation 9 according to arrow PF3 into the open position P2.

Figure 6:
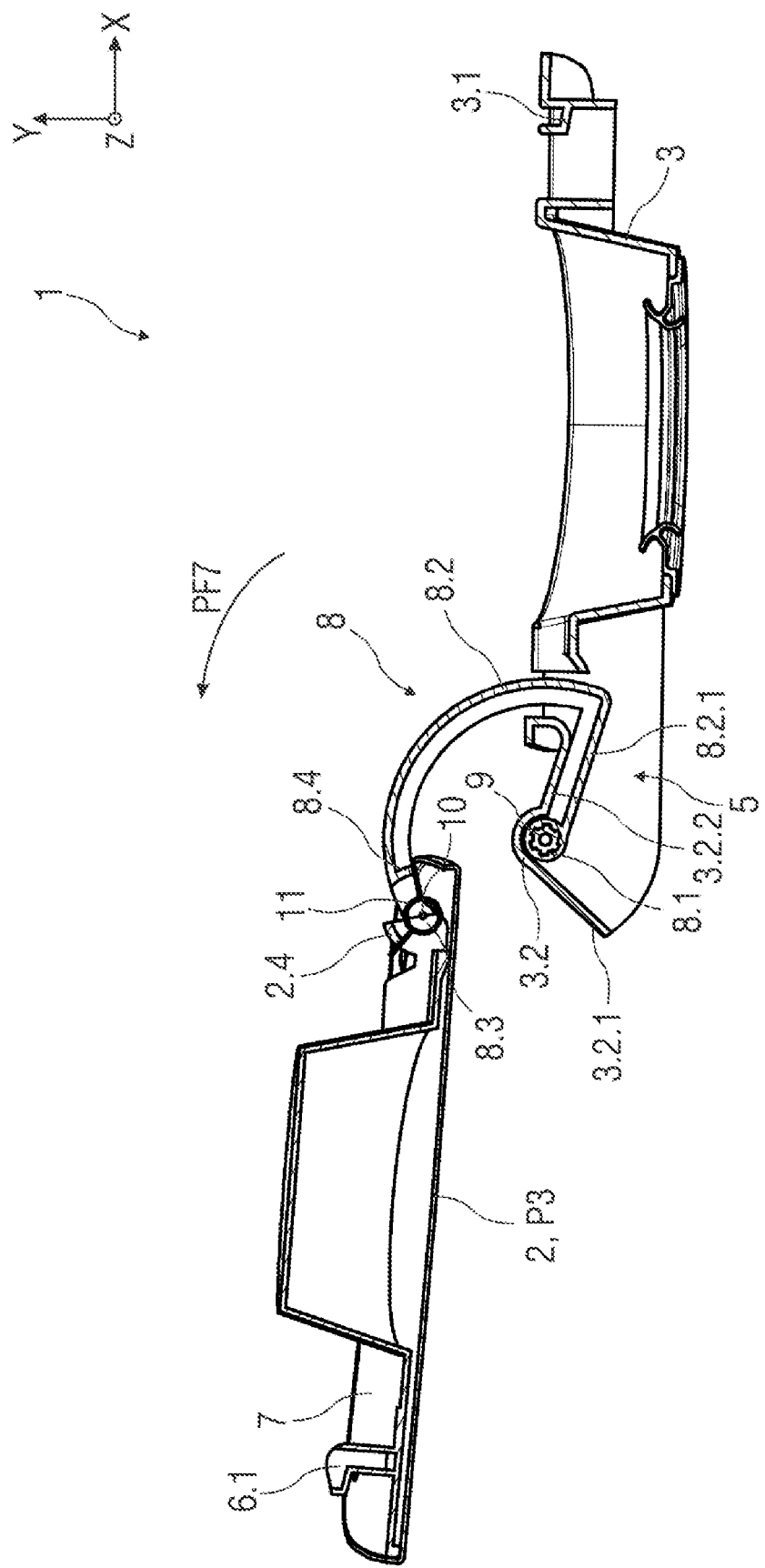
FIG. 6 shows a sectional view of a flap unit with a cover in a misuse position.

FIG. 6 shows a sectional view of the flap unit 1 with the cover 2 in a misuse position P3. In this case, the cover 2 has been manually actuated, in particular pivoted, relative to the adjusting mechanism 5 about the second axis of rotation 10 according to arrow PF7. The adjusting mechanism 5 is arrested at the stop arm 3.2.2 of the frame 3 due to the abutment of the leg 8.2.1. The cover 2 can thus be pivoted by means of the second pivot joint 8.3 relative to the frame 3 and to the adjusting mechanism 5 about the second axis of rotation 10. The spring element 11 is tensioned in this case by the cover pin 2.4 entraining the corresponding spring arm 11.1 during the pivoting movement of the cover 2 according to arrow PF7. If the cover 2 is now no longer being actuated, it will, due to the relaxation of the spring element 11, be automatically returned to the open position P2 and moved further back until the spring element 11 is relaxed.

Figure 7:
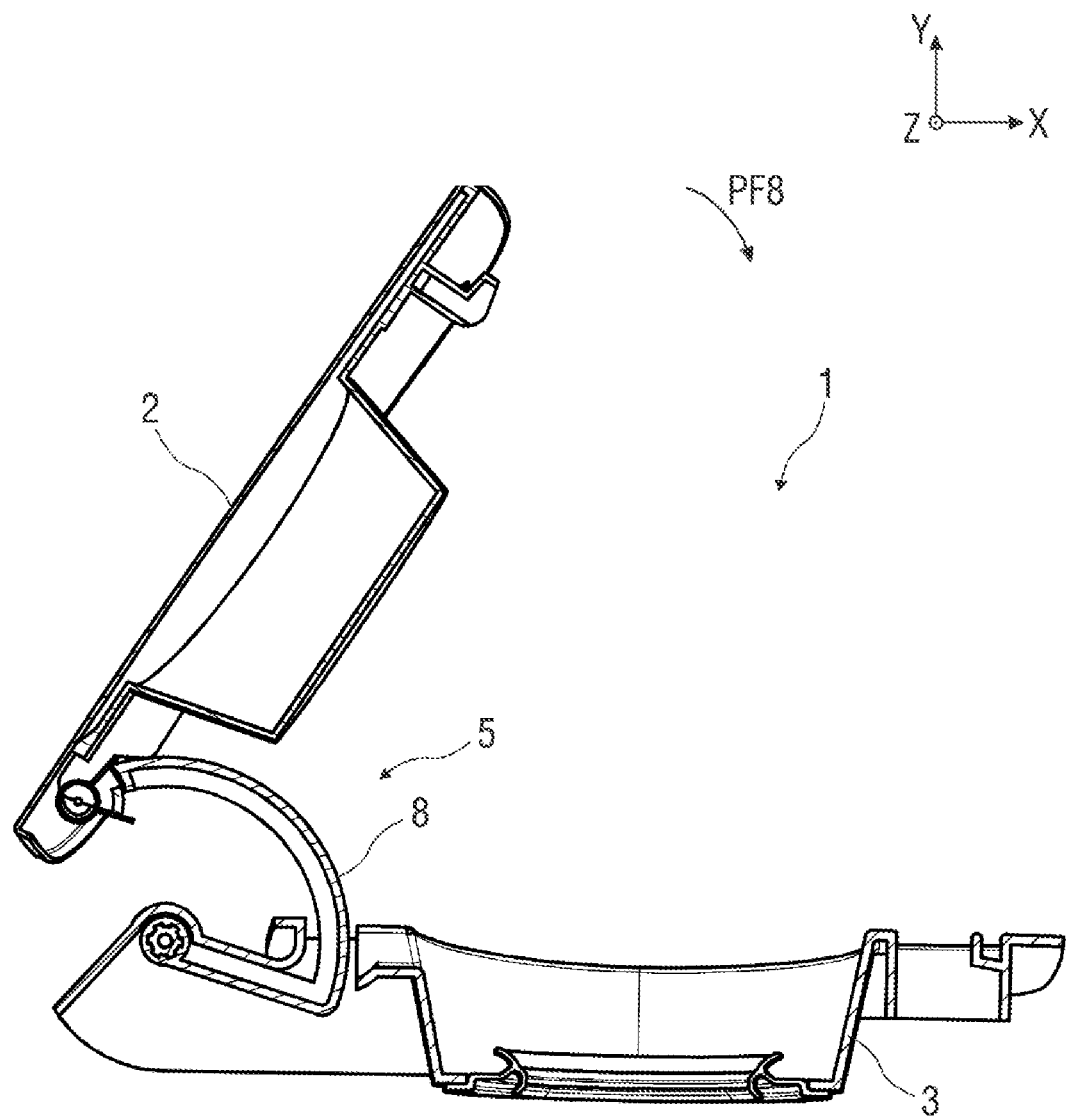
FIG. 7 shows a sectional view of a flap unit with a cover in a closing movement.

FIG. 7 shows a sectional view of the flap unit 1 with the cover 2 during a closing movement of the cover 2 as a result of the relaxation of the spring element 11 according to arrow PF8.

LIST OF REFERENCE SIGNS

1 Flap unit
2 Cover
2.1 Drive end
2.2 Holding end
2.3 Bearing element
2.4 Cover pin
3 Frame
3.1 Undercut
3.2 Joint socket
3.2.1, 3.2.2 Stop arm
4 Drive mechanism
5 Adjusting mechanism
6 Closure mechanism
6.1 Latching hook
7 Seal
8 Double pivot joint
8.1 First pivot joint
8.2 Connection member
8.2.1 Leg
8.3 Second pivot joint
8.4 Adjusting pin
9 First axis of rotation
10 Second axis of rotation
11 Spring element
11.1, 11.2 Spring arms
12 First arc
13 Second arc
100 Vehicle
101 Opening
102 Vehicle body shell
PF1-PF8 Arrows
P0 Closed position
P1 Partially raised intermediate position
P1.1 Fully raised intermediate position
P2 Open position
X Longitudinal direction
Y Transverse direction
Z Vertical direction

What is claimed is:

1. A flap unit for covering a charging opening or tank opening, of a vehicle, comprising:
    a frame and
    a cover, which is arranged movably on the frame by an adjusting mechanism,
    wherein the cover is movable between a closed position and an open position, and
    wherein the cover is lockable or locked in the closed position, and
    wherein in the case of an opening movement of the cover from the closed position into the open position as well as in the case of a closing movement of the cover from the open position into the closed position, the adjusting mechanism is pivotable about a first axis of rotation and the cover is pivotable relative to the adjusting mechanism about a second axis of rotation and is movable at least partially translationally into a partially raised intermediate position,
    and
    wherein the cover in the partially raised intermediate position is positionable or positioned relative to the frame by the adjusting mechanism in such a way that a drive end of the cover is raised at a distance from the frame and an opposite holding end of the cover facing away from the drive contacts the frame.

2. The flap unit according to claim 1, wherein, as the cover is moved from the intermediate position into the open position, and vice versa, the cover is pivotable together with the adjusting mechanism about the first axis of rotation.

3. The flap unit according to claim 1, wherein the adjusting mechanism is arranged between the cover and the frame.

4. The flap unit according to claim 1, wherein the cover at the holding end can be releasably locked to the frame by a closure mechanism.

5. The flap unit according to claim 1, wherein the adjusting mechanism comprises a double pivot joint, wherein a first pivot joint is articulated to the frame and is connected via a connection member to a second pivot joint which is articulated to the cover.

6. The flap unit according to claim 5, wherein a spring element is provided in the region of the second pivot joint and can be used to hold the cover in the closed position in a tensioned manner in the direction of the frame.

7. The flap unit according to claim 6, wherein the spring element is formed as a bistable leg spring.

8. The flap unit according to claim 5, wherein the connection member is configured to move at the first pivot about the first axis of rotation in a first arc.

9. The flap unit according to claim 5, wherein the cover is configured to move at the second pivot joint about the second axis of rotation in a second arc.

10. A vehicle having an opening and a flap unit according to claim 1 for covering the opening.

11. The vehicle according to claim 10, wherein the opening is a charging opening or a tank opening.

\* \* \* \* \*